Patented Nov. 9, 1943

2,334,021

UNITED STATES PATENT OFFICE 2,334,021

FLUID COUPLING

Raymond J. Miller, Detroit, Mich., assignor to Hydraulic Brake Company, Detroit, Mich., a corporation of California Application April 5, 1941, Serial No. 387,095

7 Claims. (Cl. 60—54)

This invention relates to fluid transmissions, and more particularly to fluid couplings of the type known commercially as fluid flywheels.

It is well established that in fluid couplings of this particular class, in a normal operation, the fluid rotates axially and adheres to the periphery of the case only at the point where the fluid passes from the impeller to the runner, and that after the fluid leaves the impeller the centrifugal force encountered in the runner tends to cause the fluid to reverse its direction and to circulate backward and outwardly between the rims of the impeller and the runner. It is the aim of the instant invention to overcome this objection.

An object of the invention is to provide a fluid coupling having means for directing the circulation of fluid in its natural path during an operation of the unit.

Another object of the invention is to provide a fluid coupling having fluid circuits so arranged as to function in unison.

Another object of the invention is to provide a fluid coupling having an impeller and a runner, and cooperative shrouds carried by the impeller and runner characterized in that the fluid in the unit is so directed by the shrouds as to eliminate vortexes and parasitic drags.

Other objects and advantages of the invention will appear from the following description taken in connection with the drawings forming a part of this specification, and in which—

Figure 1:
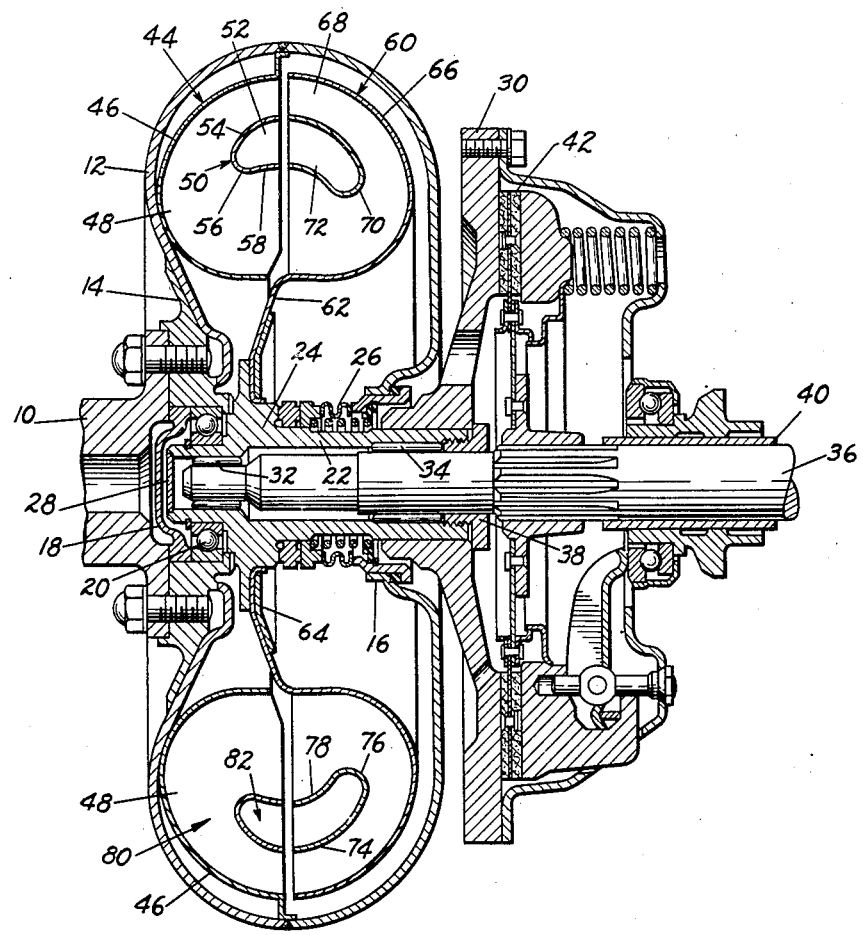
Fig. 1 is a vertical sectional view of a fluid coupling embodying the invention.

Referring to the drawings for more specific details of the invention, 10 represents a driving shaft corresponding to the crank shaft of an internal combustion engine, or other power plant. A housing or case 12 has a concentrically disposed hub 14 bolted or otherwise secured to the driving shaft, and an oppositely disposed hub 16. The hub 14 has an axial bore, and supported in this bore is a cap or closure plate 18 and a bearing 20. A sleeve 22 supported by the bearing 20 in axial alignment with the driving shaft extends through the hub 16. The sleeve 22 has a circumferential flange 24, and interposed between this flange and the hub 16 is a suitable fluid seal 26. That end of the sleeve 22 adjacent the driving shaft is closed as by a Welsh plug or cover plate 28, and a clutch member 30 is splined to the other end of the sleeve.

Spaced pin bearings 32 and 34 fitted in the sleeve 22 support for rotation a driven shaft 36, and a retaining ring 38 sleeved on the driven shaft and threaded into the sleeves serves to hold the clutch member 30 and the bearing 34 against displacement. The driven shaft 36 extends through a sleeve 40 supported on a transmission housing, not shown, and splined to the driven shaft for relative axial movement and rotation therewith is a clutch member 42 for cooperation with the clutch member 30.

An impeller, indicated generally at 44, includes an outer shroud 46 suitably secured to the inner wall of the case 12. The shroud 46 has secured thereto a plurality of impeller blades 48 supporting a shroud 50 intersecting the blades and providing in conjunction therewith a plurality of pockets 52. The shroud 50 includes an arcuate section 54 extended from the edges of the blades and converging into a rounded section 56 terminating in another arcuate section 58 diverging radially to the edges of the blades.

A runner, indicated generally at 60, includes a web 62 suitably secured to the flange 24 on the rotatable sleeve 22 and braced as by a ring 64. This web supports an outer shroud 66 in oppositely disposed relation to the shroud 46 of the impeller, and a plurality of spaced blades 68 mounted thereon support an inner shroud 70 intersecting the vanes and providing in conjunction therewith pockets 72 of greater area than the pockets 52. The inner shroud 70 is in oppositely disposed relation to the inner shroud 50 and is a counterpart thereof, except that in cross-section it is elongated; hence it includes an arcuate section 74 extended from the edges of the vanes 68 and converging into a rounded section 76, nearer to the axis of the runner than the rounded section 56 of the shroud 50, terminating in another arcuate 78 diverging radially to the edges of the vanes. The relation of the impeller and the runner to one another, and, more particularly, the arrangement of the blades of the impeller and the blades of the runner and the respective shrouds is such as to provide an outer fluid circuit 80 between the outer and inner shrouds, and an inner fluid circuit 82 confined within the inner shrouds. The characteristics of the inner shrouds and their relationship to one another are important factors in that the contour of the cooperative shrouds is substantially kidney-shaped in cross-section, and, accordingly, is such as to direct the flow of fluid in the respective circuits in its normal natural movement wherein the fluid adheres to the internal and external profiles of the inner shrouds and to the periphery of the outer shrouds. Because of this, the fluid moving in one direction and impinging upon fluid moving in the opposite direction is reduced in turbulence to such an extent as to avoid vortexes and parasitic drags materially detracting from efficient functioning of the coupling.

Figure 2:
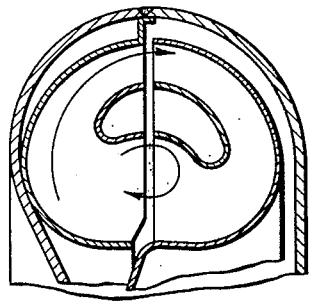
Figs. 2, 3, 4 and 5 are diagrammatic views illustrating the movement of fluid in the circuits.
Figure 3:
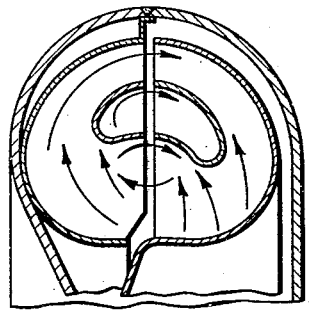

In a normal operation, assuming that the housing or case 12 is filled with fluid to a predetermined degree of its capacity, upon initial rotation of the case by force received from the shaft 10, the fluid in the circuit 80 is energized by centrifugal force introduced through rotation of the case and by the impeller 44. The fluid thus energized moves in the directions indicated by the arrows in Fig. 2. The energy of the fluid is absorbed by the runner 60, causing slight rotation thereof. As the speed of rotation of the case and impeller increases, the fluid in the circuit 80 is further energized by the centrifugal force and the impeller, resulting in imparting further energy to the fluid with the consequent movement thereof, as indicated by the arrows in Fig. 3, wherein the direction of movement of the fluid is influenced by the inner shrouds 50 and 70. Concomitantly therewith, the fluid in the circuit 82 is energized by the centrifugal force and the impeller to move, as indicated by the arrow in circuit 82 of Fig. 3, and the energy of the fluid in the circuit 82 is received by the runner. The movement of the fluid in the circuits 80 and 82 is now in unison.

Figure 4:
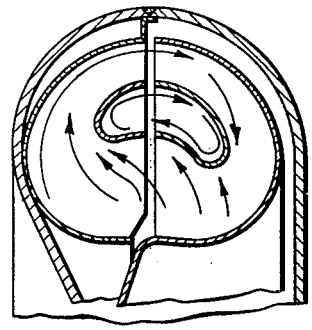
Figure 5:
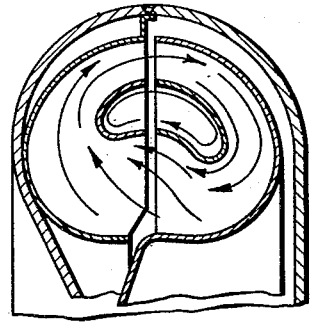

As the speed of rotation of the case and the impeller further increases, the fluid in the circuits 80 and 82 is further energized by the centrifugal force and the impeller, with the resultant movement of the fluid, as indicated in Fig. 4, wherein the cycles of movement of fluid in the circuit 82 are complete, and upon attaining full speed of rotation of the case, impeller, and runner, the cycles of movement of fluid in both circuits are completed, as indicated by the arrows in Fig. 5.

Because of the profiles of the inner shrouds 50 and 70, and the energizing forces imposed on the fluid, the movement of the fluid is maintained in its natural course, and thus vortexes and parasitic drags tending to destroy efficient operation are avoided.

Figure 6:
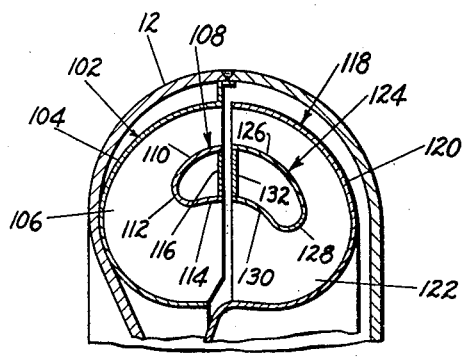
Fig. 6 is a modification of the impeller and runner.

A modification of the invention is illustrated in Fig. 6. In this modification an impeller indicated generally at 102 includes an outer shroud 104 having mounted thereon a plurality of spaced blades 106 supporting an inner shroud 108 characterized in that it includes an arcuate section 110 extended rearwardly from the edge of the blade and converging into a rounded section 112 converging into another arcuate section 114 extended radially to the edges of the blades and terminating in a flat section 116 extended in a plane complementary to the edges of the blades to the beginning, so as to close off those portions of the impeller blades within the inner shroud. It will, of course, be understood that those portions of the blades confined in the inner shroud may be eliminated, and likewise the flat section 116.

A runner 118 associated with the impeller 102 includes an outer shroud 120 having mounted thereon a plurality of blades 122 supporting an inner shroud 124 having the same characteristics as the inner shroud of the impeller, and oppositely disposed with relation thereto and co-operating therewith to complete the fluid circuits. The profile of the inner shroud 124 is the same as the profile of the inner shroud of the impeller except that it is elongated, or, in other words, extends further into the bodies of the blades; hence the inner shroud 124 includes an arcuate section 126 extended from the edges of the blades inwardly of the blades and converging into a rounded section 128, in turn converging into another arcuate section 130 extended radially to the edges of the blades and terminating in a flat section 132 extended in a plane complementary to the edges of the blades to the beginning, to cover those portions of the vanes enclosed within the shroud. It will, of course, be understood that, as in the impeller, those portions of the blades within the shroud may be eliminated, and, likewise, the flat section 132, since when the blades are so enclosed they have no function.

The mode of operation is the same as in the preferred embodiment, except that the inner circuit is eliminated.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A fluid coupling comprising a driving member and a driven member, and opposed shrouds on the members providing a power transmitting fluid circuit substantially kidney-shaped in cross section and having greater area on one of the members than on the other member the shroud on the driven member extended closer to the axis of the coupling than the shroud on the driving member.

2. A fluid coupling comprising a driving member and a driven member, and opposed shrouds on the members providing multiple power transmitting fluid circuits one within the other, each of the circuits having greater area on one member than on the other member the inner circuit being substantially kidney-shaped in cross-section and the outer circuit having greater volume adjacent its inner perimeter than at its outer perimeter the shroud on the driven member extended closer to the axis of the coupling than the shroud on the driving member.

3. A fluid coupling comprising an impeller, a runner associated therewith, and shrouds carried by the impeller and the runner providing two separate power transmitting fluid circuits one within the other, the outer circuit having greater area on the impeller than on the runner, and the inner circuit having greater area on the runner than on the impeller the inner circuit being substantially kidney-shaped in cross-section and the outer circuit having greater volume adjacent its inner perimeter than at its outer perimeter.

4. A fluid coupling comprising an impeller, a runner associated therewith, and cooperative inner shrouds carried by the impeller and the runner providing a kidney-shaped fluid guide means having a part on the runner extended closer to the axis of the coupling than the corresponding part on the impeller.

5. A fluid coupling comprising an impeller, a runner associated therewith, and cooperative inner shrouds on the impeller and runner providing a main circuit and an inner recurrent circuit extended nearer to the axis of the coupling on the runner than on the impeller.

6. A fluid coupling comprising an impeller, a runner associated therewith, and cooperative inner shrouds on the impeller and runner providing a main circuit and an inner recurrent circuit extending gradually inwardly nearer to the axis of the coupling on the runner than on the impeller.

7. A fluid coupling comprising an impeller, a runner associated therewith, and cooperative shroud sections on the impeller and runner providing in conjunction with one another a main circuit and a recurrent circuit, the shroud section on the runner extending gradually on the runner nearer to the axis thereof than the shroud section on the impeller thereby directing the flow of fluid moved under centrifugal force to the impeller.

RAYMOND J. MILLER.